Figure 10:
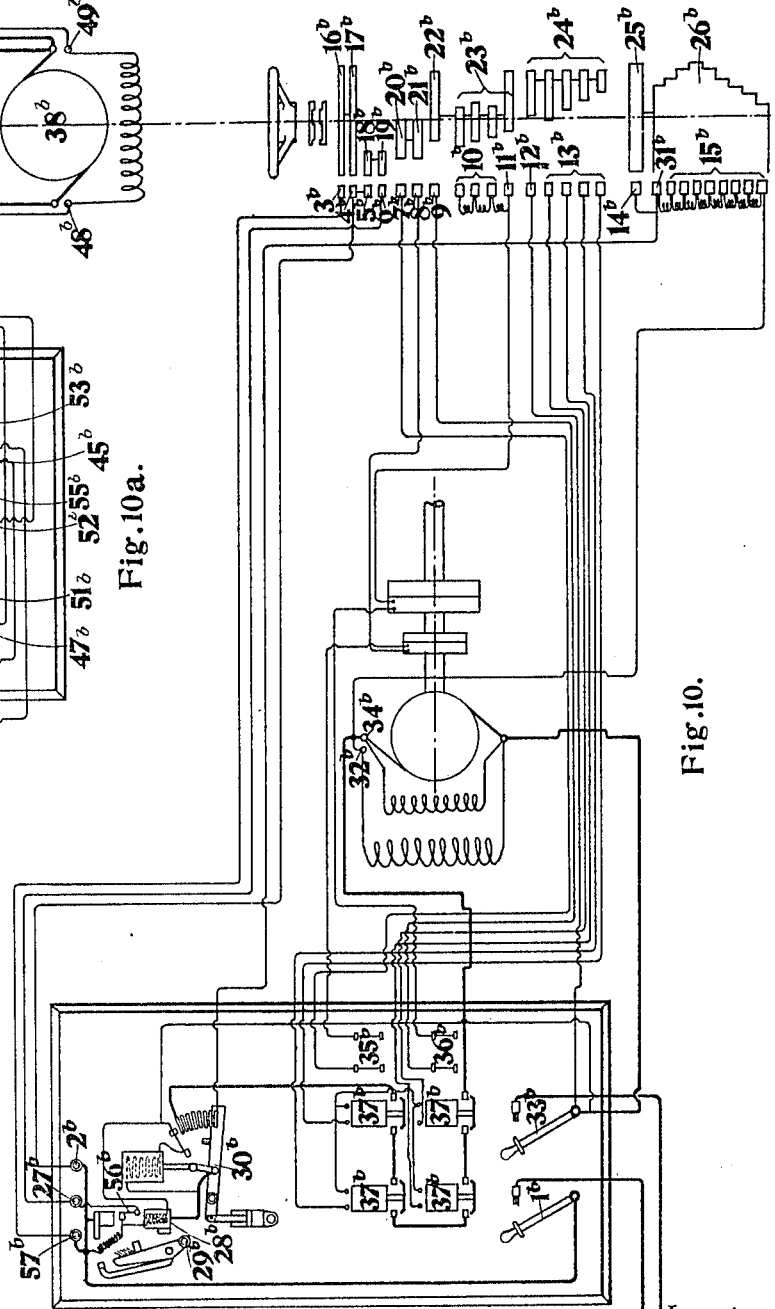
Figure 10A:
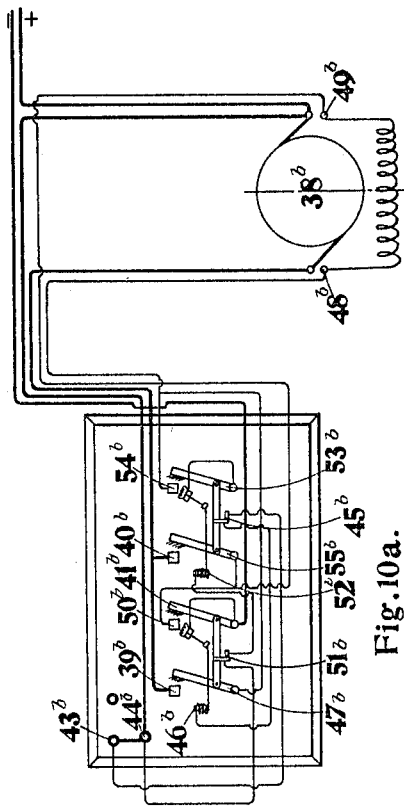

G. W. MASCORD.
DISTRIBUTION OF ELECTROMOTIVE POWER.
APPLICATION FILED NOV. 23, 1912.
1,309,443.
Patented July 8, 1919.
8 SHEETS—SHEET 1.
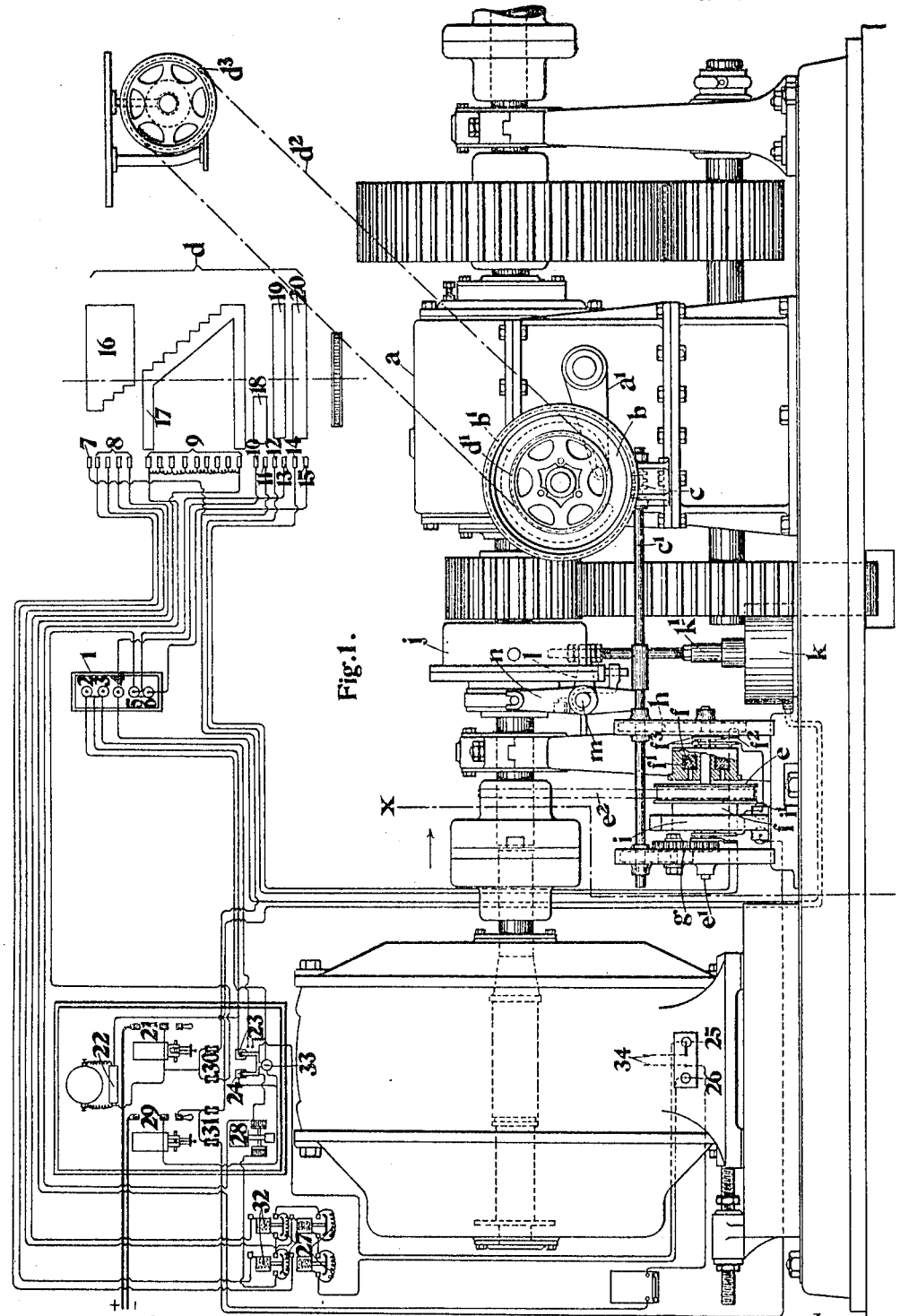

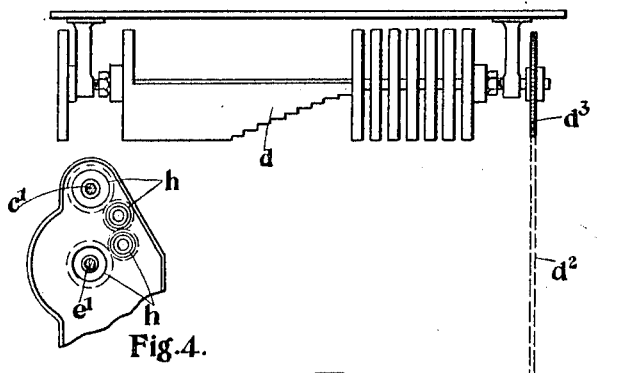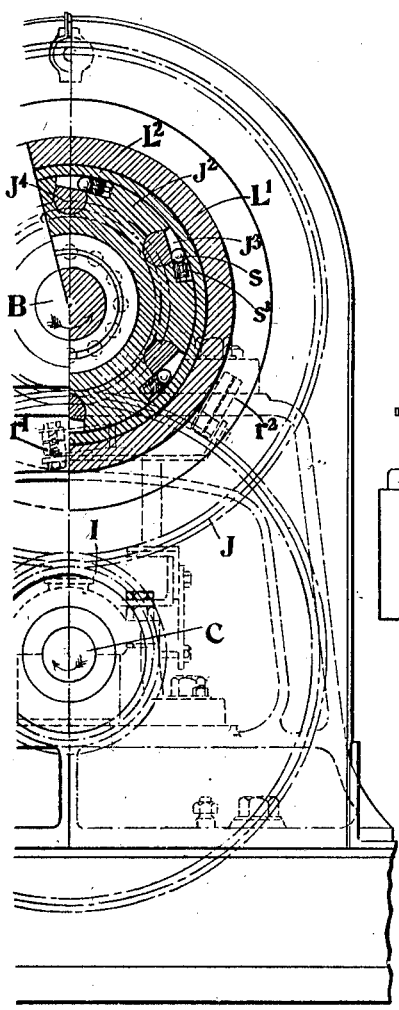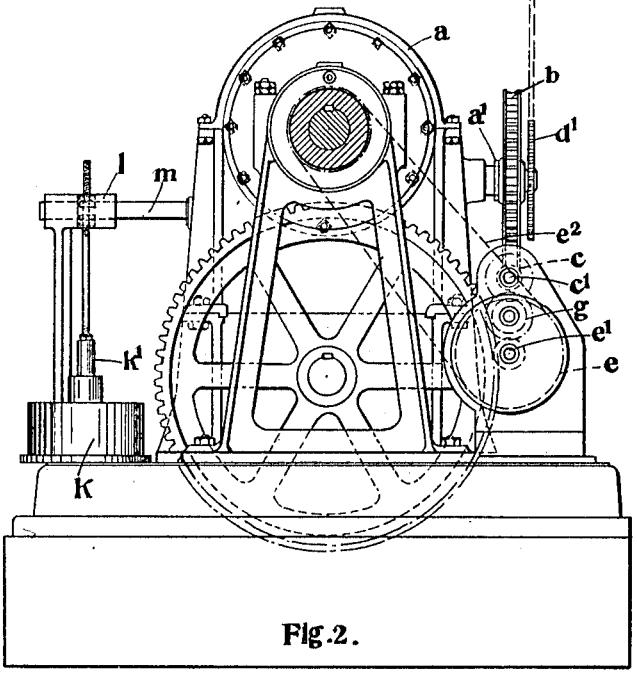

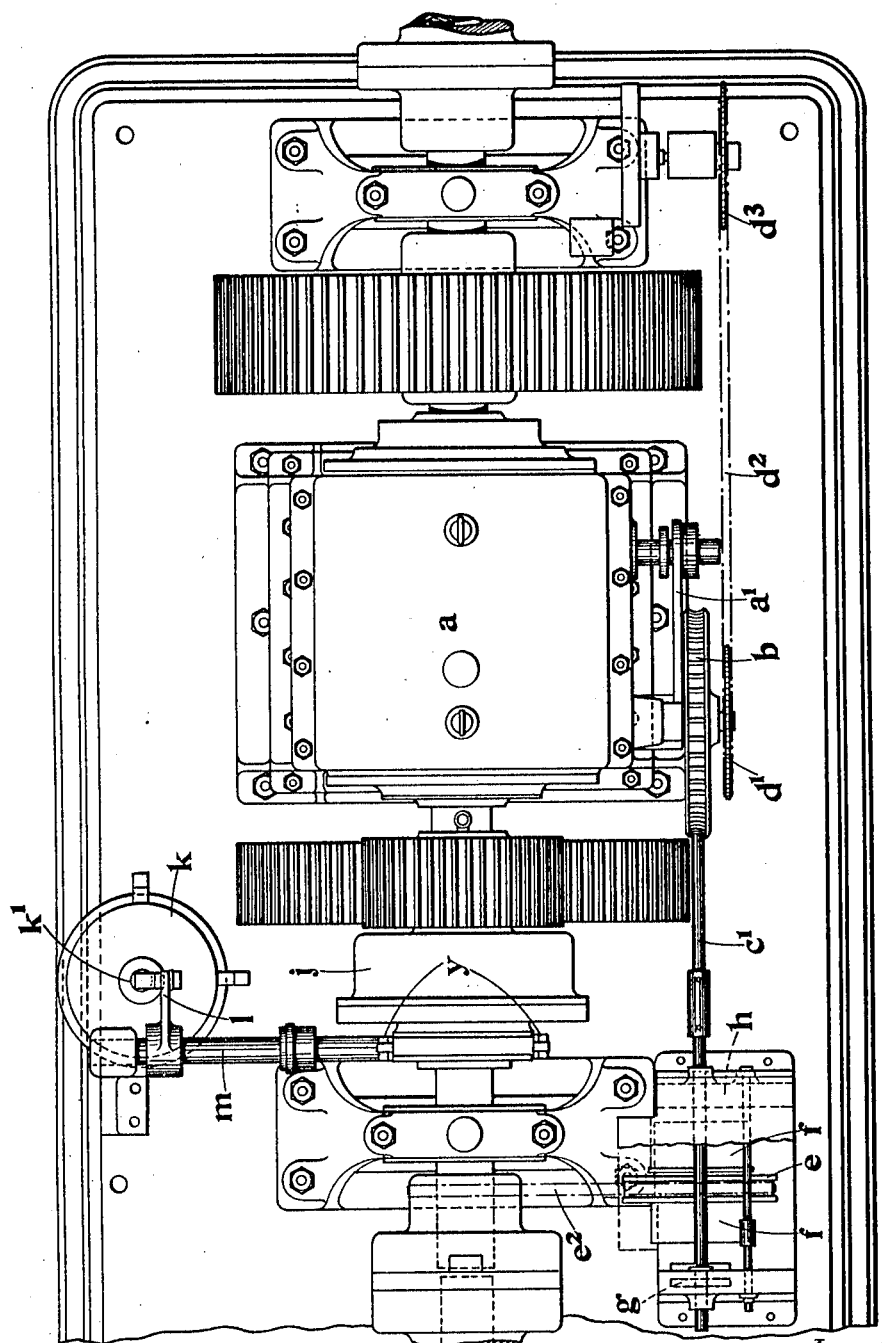

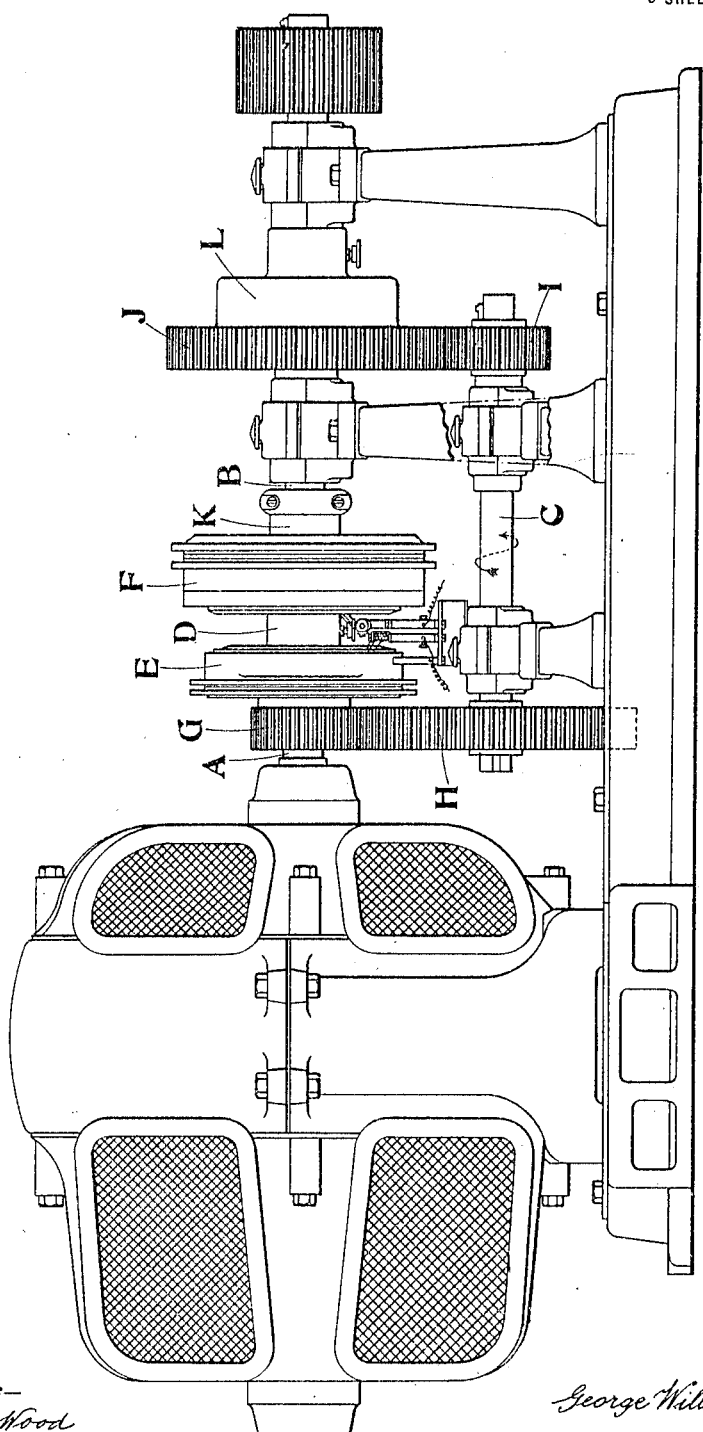

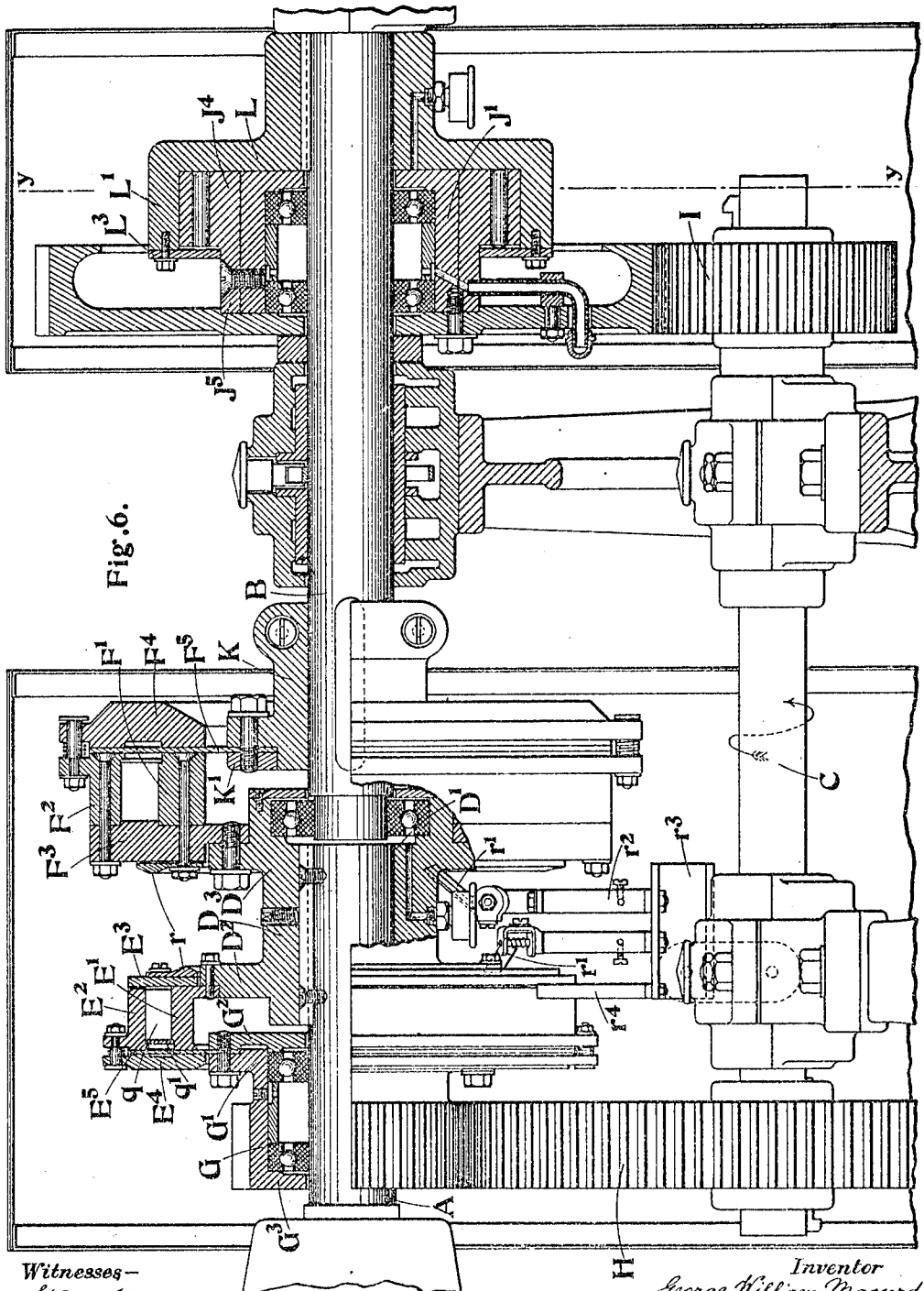

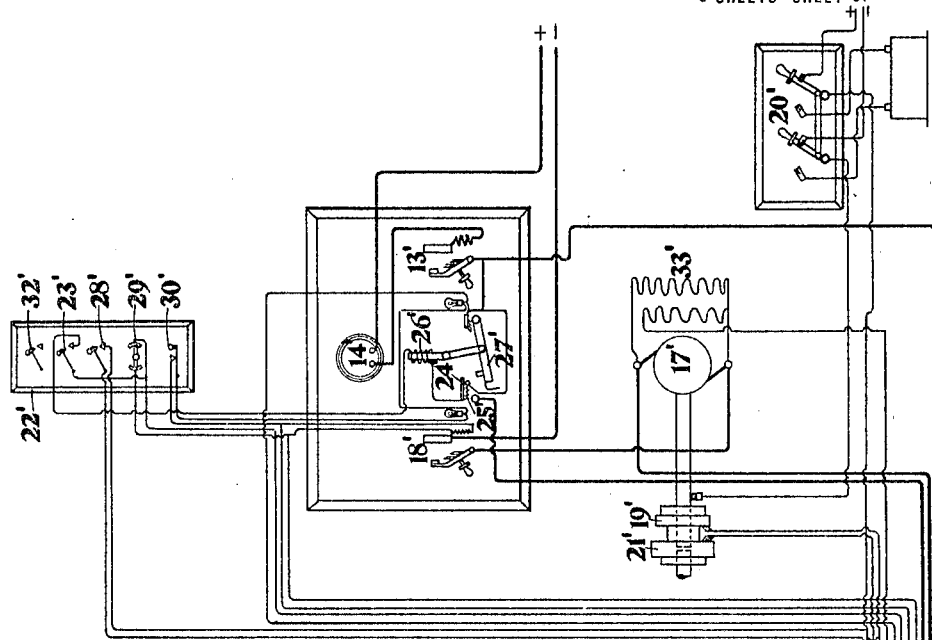
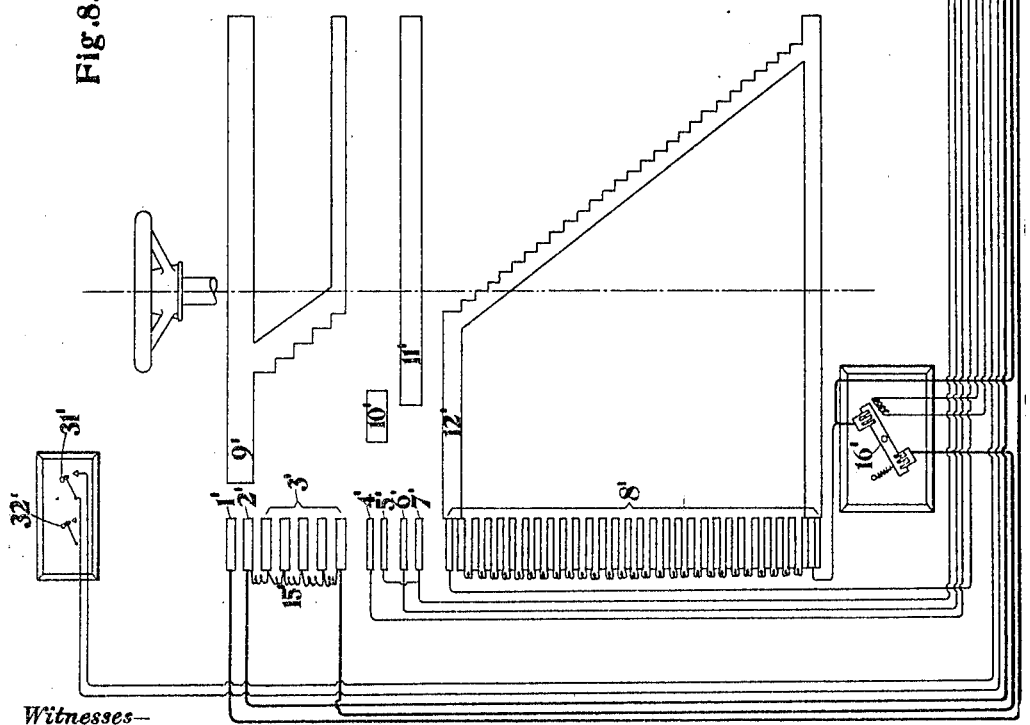
Fig. 8.

G. W. MASCORD.
DISTRIBUTION OF ELECTROMOTIVE POWER.
APPLICATION FILED NOV. 23, 1912.
1,309,443.
Patented July 8, 1919.
8 SHEETS—SHEET 7.
Fig.9.
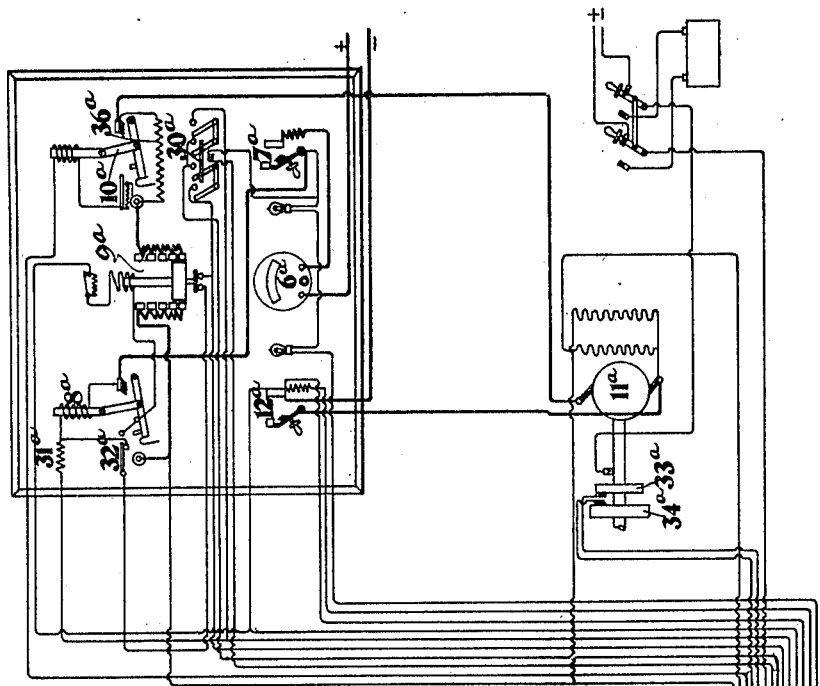
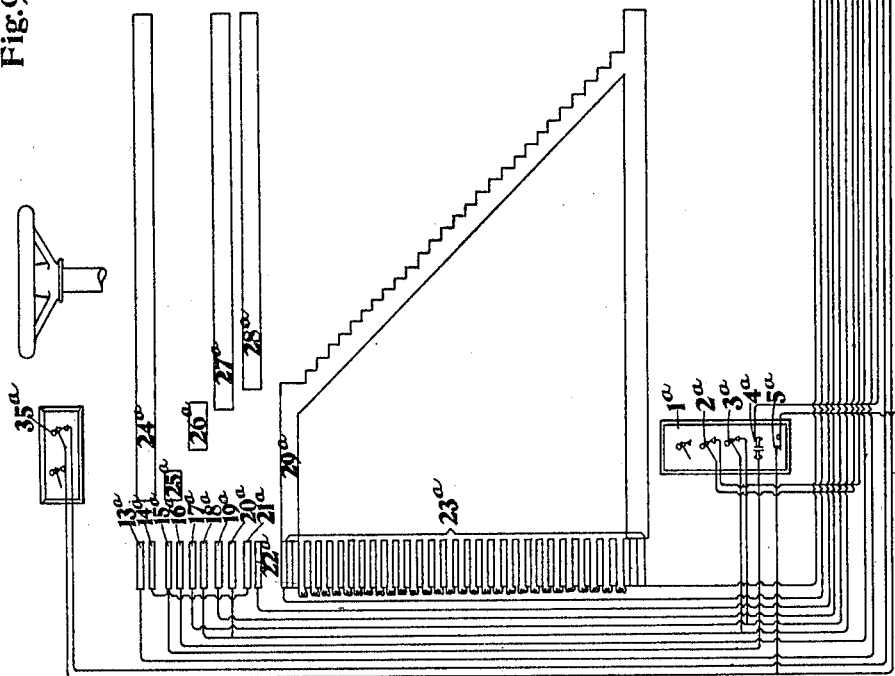
Witnesses—
Stanley Wood
Lionel Ernest Bussey.
Inventor
George William Mascord
by
W. ......
Attorney.

G. W. MASCORD.
DISTRIBUTION OF ELECTROMOTIVE POWER.
APPLICATION FILED NOV. 23, 1912.

1,309,443.

Patented July 8, 1919.
8 SHEETS—SHEET 8.

Witnesses—
Stanley Wood
Lionel Ernest Bussey

Inventor
George William Mascord
by
Attorney.

UNITED STATES PATENT OFFICE.

GEORGE WILLIAM MASCORD, OF LONDON, ENGLAND.

DISTRIBUTION OF ELECTROMOTIVE POWER.

1,309,443.  Specification of Letters Patent.  Patented July 8, 1919.

Application filed November 23, 1912. Serial No. 733,203.

*To all whom it may concern:*

Be it known that I, GEORGE WILLIAM MASCORD, a subject of the King of Great Britain and Ireland, residing at 5 The Crescent, Barnes, London, S. W., England, have invented certain new and useful Improvements in and Relating to the Distribution of Electromotive Power, of which the following is a specification.

This invention relates to the application and distribution of motive power for use in starting machinery under heavy torque and for similar purposes where electro-motors, internal-combustion engines and motors with similar characteristics, as regards starting torque, are employed as the source of motive power and is especially applicable to electric plants for driving rotary printing presses.

The invention has for its object to improve the construction of the starting gear for the said purposes and to render the series of operations of a single motor equipment more convenient, effective, and reliable, the special feature being that though the load is started direct from a single motor with a full load capacity, such starting is always carried out without excessive draft of current from the source of supply and without risk of injurious effects upon the motor or machinery to be driven.

The invention is applicable to starting gear and speed gear where mechanism is provided for the reduction of the normal speed at starting and for increasing the speed after the inertia and resistance at starting have been overcome.

According to the invention I provide electrical means for operating the clutch for the reduced or low speed and the clutch for the direct drive or for the higher speed and for the simultaneous control of the motor.

According to the invention also I may dispense with the usual form of clutch used for the reduced speed gear and the direct drive and replace these by magnetic clutches possessing special characteristics and flexibility, controlled in regular sequence by the same controller as the motor.

The gripping or driving members of the two magnetic clutches may be mounted upon the same boss or sleeve and in such manner that either member may be operated separately to clutch its respective armature for the purpose of rotating the shaft upon which the latter is secured.

The invention also comprises the constructional features hereinafter described.

The application of the invention to electrically-driven equipments is illustrated in the accompanying drawings, in which—

Figure 1 represents a side elevation of one particular arrangement or equipment, showing diagrammatically the electrical connections and fittings.

Fig. 2 is an end elevation taken on the line $x$, $x$ of Fig. 1, in the direction of the arrow, Fig. 3 represents a plan view, Fig. 4 is a detail view illustrating one of the transmission gearings for the worm spindle of the direct-drive clutch, Fig. 5 represents a side elevation of a modified arrangement or equipment, Fig. 6 represents a part elevation in section, to an enlarged scale, of the modified arrangement or equipment, Fig. 7 is a part end elevation of the arrangement shown in Fig. 5 to the enlarged scale, partly in section, on the line $y$, $y$ of Fig 6, Fig. 8 represents a diagram of electrical connections for the modified arrangement or equipment provided for hand control and without an automatic starter, Fig. 9 represents a diagram similar to Fig. 8, but illustrating the use of an automatic starter and Figs. 10 and 10ª represent a diagram of electrical connections for the modified arrangement or equipment illustrating the use of a hand or motor control with an automatic starter.

The reference letters employed in the description of the modified arrangement or equipment differ from those used in the description of the first arrangement.

In carrying out the invention according to the arrangement represented in Figs. 1 to 4 of the drawings I provide a clutch $a$ for the direct drive, from the driving to the driven shaft, of any suitable construction and I effect the movement of the operating lever $a^1$ thereof by means of a worm wheel $b$ provided with a groove $b^1$ which for a portion of its length serves as a cam groove and for the remainder of its length is concentric with the worm wheel so that on the rotation of the worm wheel the operating lever $a^1$ which is engaged with the groove is moved gradually by the cam portion of the groove to throw the clutch $a$ into operation.

The teeth of the worm wheel $b$ engage with a worm $c$ mounted upon a spindle $c^1$ whose rotation in one or other direction is caused, by suitable means hereinafter described, to effect the engagement or disengagement of the direct-drive clutch device.

The clutch $a$ is put in direct connection with the motor controller $d$ and for the purpose the worm wheel $b$ or spindle or sleeve upon which it is mounted is provided with a chain wheel $d^1$ which gears by means of a chain $d^2$ with a chain wheel $d^3$ upon the spindle of the controller $d$, so that thus the controller and the clutch are positively and permanently set to operate together. Alternatively direct-acting gear or couplings may be used between the clutch and the controller.

For the purpose of effecting the movement of the worm spindle $c^1$ in one or other direction for the engagement or disengagement of the clutch $a$ I advantageously provide an apparatus electrically operated and controlled from any suitable position and this apparatus consists of an iron pulley $e$ loosely mounted upon a suitable spindle $e^1$ and caused to rotate continuously by means of a belt $e^2$ from the motor shaft or a member mounted thereon. This pulley is disposed so as to be capable of a slight lateral movement upon its spindle $e^1$, and upon the spindle at each side of the pulley a soft iron boss $f$ is loosely mounted, a magnetizing coil or coils $f^1$ being provided in or around each of these bosses, such coils receiving current by means of brushes or contact pieces $f^2$ mounted to contact with slip rings $f^3$ provided upon or secured to the bosses and connected with the ends of the coil or coils, so that thus one or other of the bosses will be energized and will attract the pulley $e$ and the movement of the pulley will then be imparted to the boss which is energized, whereby a train of gear, for instance $g$, will be set into operation for the rotation of the worm spindle $c^1$ in one direction. Similarly, if the soft iron boss $f$ on the other side of the pulley $e$ is energized, the pulley is attracted to it, in the opposite direction, and this puts into operation a train of gear $h$ which will effect the movement of the worm spindle $c^1$ in a direction opposite to that of its rotation from the gear $g$ at the other side of the pulley.

A brake strap or straps $i$ is or are caused to encircle or partially encircle one or both the bosses $f$ referred to, the arrangement being such that, upon the current passing through either of the coils of the soft iron bosses, it will pass also through a suitable electromagnet or electromagnets $i^1$ which is or are adapted to draw the brake off the boss or bosses to permit the rotation thereof, while when the current is cut off, a suitable spring comes into action to draw the brake down frictionally to engage with and prevent the further rotation of the soft iron boss $f$.

The spindle $e^1$ upon which the iron pulley $e$ is carried is advantageously disposed and carried within a casing or frame in position parallel with the worm spindle $c^1$ or an extension thereof and the necessary gear $g$, $h$, is advantageously mounted on each side, one gear $g$ consisting of a pinion secured to the corresponding iron boss $f$ engaging with a toothed wheel on a second spindle, with which toothed wheel a pinion is integrally formed for engagement with a toothed wheel mounted upon the worm spindle or extension thereof, and the other gear $h$, provided on the other side for the reverse rotation, having for example, a gear wheel secured to the other iron boss $f$ engaging directly with a wheel on the worm spindle $c^1$ or indirectly through two other wheels on separate spindles as shown in Fig. 4, if necessary.

The low-speed clutch $j$ which transmits the drive from the driving shaft to the driven shaft through low-speed gearing is operated by means of a solenoid $k$ suitably energized and controlled, and the core $k^1$ of the solenoid may be connected to an arm $l$ mounted upon a suitable spindle $m$ upon which spindle is also mounted a forked arm $n$ to which the sliding member of the clutch is connected, the arms $l$ and $n$ serving as a lever.

I prefer to mount the motor in line with the low-speed and the direct-drive clutches $j$ and $a$, and I advantageously mount the direct-drive clutch upon the same foundation plate as the motor and I also provide the direct-drive clutch-operating gear on the same foundation plate. It is obvious however, that I may when desirable use a high speed motor geared down to the driving shaft before reaching the low-speed clutch.

In carrying the invention into effect according to the modification illustrated in Figs. 5 to 10$^a$ of the accompanying drawings magnetic clutches are used both for the low speed and for the direct drive. The driving and driven shafts A, B, respectively are alined to one another and at the end of the driving shaft there is fixedly mounted a boss D or sleeve which carries the driving member of each of the clutches E, F.

The driven member of the low-speed clutch is secured to the first pinion G of the low-speed gear, which pinion is loosely mounted upon the driving shaft and meshes with a toothed wheel H upon the counter-shaft C which is suitably carried in bearings upon the main bed plate. A second pinion I fixed upon the counter-shaft meshes with a toothed wheel J loosely mounted upon the driven shaft B and having a free-wheel connection therewith.

The driven member of the high-speed or main clutch is secured to a boss K fixedly mounted upon the driven shaft.

The boss D carrying the driving members of the two clutches is secured upon the driving shaft A by means of a feather or key and a locking screw. It is conveniently provided to project beyond the end of the driving shaft where it is recessed, at $D^1$, to receive the reduced extremity of the driven shaft B in a suitable ball bearing which may be maintained in position by a closing ring secured to the end of the boss. The driving members of the two clutches are secured to flanges $D^2$ $D^3$ suitably formed upon the boss.

The driving member of the low-speed clutch E consists of two concentric rings $E^1$ $E^2$ of iron or other magnetic material distanced apart by means of a third ring $E^3$ secured to them at the one side, an air gap being advantageously left between the outer ring $E^2$ and the third ring $E^3$. In the annular space $q$ thus formed a magnetizing coil or coils is or are disposed, being maintained in position by a ring $q^1$ of brass or other metal sprung into a seating provided by shoulders formed on the respective rings. The free sides of the rings $E^1$ $E^2$ are faced off to form clutching surfaces.

The outer ring $E^2$ is provided with a flange which serves to carry the armature member $E^4$ of the clutch by means of a series of pins or studs passing loosely through a series of holes in the armature and having coiled springs upon them to press the armature away from the driving member of the clutch when it is demagnetized. The armature is provided as an annular plate of width sufficient to span the two rings $E^1$ $E^2$.

The first pinion G of the low-speed gear is carried upon the driving shaft A through suitable ball or roller bearings and is provided with an outwardly projecting flange $G^1$ to which the driven member of the low-speed clutch is secured by means of a clamping ring $G^2$ which is formed so as to serve also to maintain the ball or roller bearings in position as determined by an inwardly projecting flange $G^3$ at the opposite side of the pinion.

The driven member $E^5$ of the clutch is provided as an annular plate of sheet metal, such as saw steel, which is positioned between the clutching surfaces of the rings $E^1$ $E^2$ and the armature $E^4$.

In the operation of the clutch, on closing the circuit, the passage of a current through the magnetizing coils effects the magnetization of the rings $E^1$, $E^2$, $E^3$, which draws the armature $E^4$ and driven member $E^5$ of the clutch toward them, thus clutching the pinion G to the driving shaft A.

The high-speed or main clutch driving member is formed in a similar manner to the low-speed clutch, that is to say it is comprised by the three rings $F^1$, $F^2$, $F^3$, inclosing the magnetizing coil or coils, and the armature $F^4$.

The driven member $F^5$ of the high-speed or main clutch is secured by a clamping ring $K^1$ to a flanged boss K fixedly mounted on the driven shaft.

The current is led to the magnetizing coil or coils of each clutch by means of a slip-ring $r$ which is secured to the rear of the ring $E^3$, $F^3$, but insulated therefrom.

The brushes $r^1$ by which the current is conveyed to the slip-rings $r$ are each mounted upon a suitable support $r^2$ secured to but insulated from an angle-iron or other bracket $r^3$ suitably disposed, as, for instance, on one of the bearings of the counter-shaft C. An earth return is employed and for the purpose a brush $r^4$ secured to the bracket $r^3$ may be provided to contact with the driving member of the low-speed clutch. A second brush may be provided for the high-speed or main clutch.

The toothed wheel J by which the low-speed drive is transmitted to the driven shaft B from the countershaft C is secured to a sleeve or boss $J^1$ carried on the driven shaft by means of ball bearings.

The free-wheel clutch action is conveniently secured in the following manner.— Upon the driven shaft B there is keyed a disk-like member L having a peripheral flange $L^1$ lined with a removable contact ring $L^2$, which fits slidably or loosely over an enlarged portion $J^2$ of the boss in the periphery of which is formed a series of recesses $J^3$ tapering circumferentially for the reception of a corresponding series of rollers S each of which is pressed toward the narrower part of the recess $J^3$ by a presser block $S^1$ provided with a leaf or other spring. The roller-contact faces of the recesses are preferably made to be capable of renewal. For this purpose blocks $J^4$, the cross-section of which is a segment of a circle substantially more than a semi-circle, are arranged in corresponding recesses formed at the bottom of the tapered recesses J³ and are secured in position upon the boss J¹ by such means as screws J⁵ passing through the blocks J⁴ at the one end, which is preferably reduced in thickness so as to be flush with the smaller diameter of the boss.

The relative position of the disk-like member L and the boss J¹ is maintained by a ring L³ secured to the member L and projecting over the enlarged portion J² of the boss.

It will be observed that on the rotation of the toothed wheel J from the countershaft C the disk-like member L will be locked thereto by the action of the rollers S, but on the rotation of the driven shaft B from the high-speed or main clutch F no locking effect of the rollers will be produced and therefore the member will rotate over the boss J¹ without exerting any driving force upon it.

It will be understood that the arrangement of the clutches and gear relatively to the motor or each other may be determined according to the requirements of particular applications of the invention. Thus, compact arrangement of the equipment is secured by arranging the motor between the low-speed and high-speed clutches, the driving members of which are respectively mounted one on each side of the motor on extensions of the motor shaft. The countershaft is mounted adjacent the motor, the slow-speed being transmitted from the driving shaft on one side of the motor to the driven shaft at the other side of the motor.

Although the energized members of the magnetic clutches have been described as the driving members it is clear that they may be employed as the driven members.

The following is the description of the electrical connections and fittings employed according to the several systems of control illustrated in the drawings, in each of which a separate series of reference numerals is used.

The electrical connections and fittings required for the control and operation of the arrangement or equipment first described are shown in Fig. 1. In this the starting and stopping of the motor and the closing of the circuits for the magnetic bosses $f$ operating the high-speed clutch $a$ and the solenoid $k$ operating the low-speed clutch $j$ are effected by push-button control at a box 1 while the regulation and control of the operation of the motor and the clutches is effected from the controller $d$ rotated from the worm spindle $c^1$.

The box 1 is provided with five buttons; 2 to start the motor, 3 to stop the motor, 4 to close the circuit for the solenoid of the low-speed clutch, 5 to close the circuit for the left-hand magnetic boss, and 6 to close the circuit for the right-hand magnetic boss. The button 2, when operated, closes its circuit, while the button 3 is normally closed.

The current from the positive supply main is led to a circuit-breaker 21 and passes thence through an ammeter 22 to a contact 23 of a double-pole automatic switch and to the push-button box 1 by the supply lead for the buttons 2 and 3. The button 2 being depressed to effect the starting of the motor, the current passes to the operating coil 33 of the double-pole automatic switch, which is thus operated to close both leads of the main motor circuit, and returns by way of the circuit-breaker 29 to the negative supply main. The movement of the arms of the double-pole switch serves at the same time to press upon and close a contact device connected with the return lead from the closed button or switch 3 and completing a circuit through a cooling resistance to the coil 33, so that the latter receives current independently of the button 2 and thus maintains the double-pole switch closed until its supply is cut off by the opening of the button or switch 3.

The double-pole automatic switch being closed the main supply is led to the motor armature terminal 25 and, passing through the armature, returns from the terminal 26 through the armature resistances 27 to the automatic starter 28 and thence to the contact 24 of the automatic switch and through the circuit-breaker 29 to the negative supply main.

The motor field circuit is made from the armature terminal 25 at 34 and thence to one of the controller contact blocks 9 and by the contact 17 to a second contact block 9 whence it returns to the negative side of the automatic starter 28.

The low-speed clutch $j$ is put into operation when the motor has started, by the closing of the circuit through the button 4. Current then passes from the circuit-breaker 21 through one of the fuses 30 to the fixed contact block 11 and by the limit contact 18 to the fixed contact block 10, to the button 4 and thence to the solenoid $k$, returning through one of the fuses 31 to the circuit-breaker 29.

When the speed of the motor has risen sufficiently the low-speed clutch circuit is broken and the left hand boss is energized to attract the pulley $e$ by the closing of the circuit through the button 5. Current then flows from the circuit-breaker 21 to the button 5 and thence by the fixed contact blocks 13 limit contact 19 and 12 to the magnetic boss, returning through the magnet coil $i^1$ of the brake strap $i$ to the circuit-breaker 29 by way of a fuse 31. The worm spindle $c^1$ is thus rotated to put the main clutch into operation and to operate the controller d. As the controller contact drum is rotated the contact 16 is caused to short-circuit the fixed contact block 7 with the fixed contact blocks 8 successively. Current is thus passed from the block 7 through the blocks 8 to the armature resistance cut-outs 32 so that the armature resistance is reduced and finally cut out.

To regulate the motor field the controller drum is rotated until the desired number of resistances connected with the fixed contact blocks 9 have been cut into the field circuit by the contact 17. The button 5 is then released. When it is desired again to cut out the field resistances or to put the high speed clutch out of operation the button 6 is used to close a circuit through the fixed contact blocks 15, limit contact 20 and 14 to the right-hand magnetic boss, which upon being energized rotates the worm spindle $c^1$ in the other direction, thus rotating the worm wheel and controller drum also in the other direction.

The motor may be stopped by means of the button 3 which serves when operated, to open its circuit through the coil 33 and thus to release the automatic switch.

Referring to the diagram of the electrical connections and fittings shown in Fig. 8, illustrating the use of a hand control without an automatic starter applied in the modified construction illustrated in Figs. 5 to 7, a hand-operated controller is provided having its contacts so arranged that on rotating the hand wheel the following operations are effected. In the normal position the motor field resistances connected to the series of fixed contact blocks 8' are cut out by the contact 12'. As the hand wheel is rotated the contact 9' establishes connection between the fixed contact blocks 1' and 2'. Of these, 1' is connected to the positive supply main through the overload circuit-breaker 13' and ammeter 14', while 2' is connected through the armature resistance 15, no-volt switch 16', which is closed in the initial position of the handwheel, the motor armature 17', no-voltage circuit-breaker 18' with the negative supply main, so that thus the circuit through the motor armature is completed.

Upon the further rotation of the hand wheel, the contact 10' establishes connection between the fixed contact blocks 4' and 5'. Of these, 4' is connected to the magnetizing coil of the low-speed clutch 19' and thence with the negative lead of the clutch supply through a change-over switch 20', which serves to pass the current to the clutches from a battery or other source of supply as may be required. The contact block 5' is connected to the positive lead of the clutch supply. The low-speed clutch is thus energized and the low-speed gear set in operation.

On the continued rotation of the hand wheel the contact 11' establishes connection between the fixed contact blocks 6' and 7', which thus throws into operation the high-speed or main clutch 21' as in the case of the low-speed clutch which is at the same time cut out by the breaking of the connection between the fixed contact blocks 4' and 5' as the contact 10' moves away from them. The direct drive is thus brought into use and the speed of the motor is then raised, on the further rotation of the hand-wheel, by the cutting out of the armature resistance by the passing of the contact 9' over the fixed contact blocks 3' and the introduction into the shunt field of the resistance connected with the fixed contact blocks 8' by the contact 12' as it passes over them.

A push-button box 22' is provided for separate control of the starting and stopping of the motor. This box is provided with a locking switch 29' which serves to control the operation of the whole of the mechanism, as it is adapted to close the circuit from the positive side of the switch 27' through the retaining coil of the no-volt switch 16' and to complete the circuit through the motor starting button 23' which has the following connections.—From the overload circuit-breaker 13' a lead is taken by way of a trip connector 24' and resistance 25' to the solenoid 26' of an automatic switch 27' and thence to the push button 23' and the return is made by way of the locking switch 29' and the no-volt circuit breaker 18'. The switch 27' when operated serves to close a lead between the overload circuit-breaker 13' and the fixed contact block 2' for the completion of the circuit through the armature 17'. At the same time it throws up the trip connector 24' and brings the cooling resistance 25' into use in the circuit of its own coil. The push button 28' serves to close the circuit of the low-speed clutch.

An emergency button 30' which is normally closed controls a circuit from the positive side of the switch 27' through indicating lamps and through the coil of the no-volt circuit-breaker 18' to the negative main.

An emergency button 31' which is normally open is provided near the controller to short-circuit the coil of the no-volt circuit-breaker 18'.

32' represents bell pushes, and 33' represents an electric brake for the motor, in circuit across the armature.

Referring to Fig. 9 which illustrates the use of a hand controller with an automatic starter applicable to the modified construction illustrated in Figs. 5 to 7, a push-button box 1ª is provided having a starting button 2ª, a low-speed clutch circuit button 3ª, a locking switch 4ª and an emergency button 5ª which is normally closed.

The motor armature circuit from the supply, when closed, is made through the meter 6ª, overload circuit-breaker 7ª, automatic switch 8ª, automatic starter 9ª, automatic switch 10ª, the armature 11ª, the no-voltage circuit-breaker 12ª to the negative main.

In the first position of the controller drum, the fixed contact blocks 23ª of the field resistance are short-circuited by the contact 29ª and the pairs of fixed contact blocks 13ª, 14ª and 15ª, 16ª are next short-circuited by the contacts 24 and 25 respectively.

The motor may be started either from the controller or from the push-button box 1ª.

In starting from the controller, the circuit-breakers 7ª and 12ª having been closed by hand, when the controller contacts 24ª and 25ª bridge the respective pairs of fixed contact blocks 13ª, 14ª, and 15ª, 16ª, current can pass from the positive side of the automatic switch 8ª, through the trip contact 32ª and the contacts bridged by the plunger of the automatic starter 9ª to the contact block 16ª and thence return by way of the contact block 15ª, the locking switch 4ª, and the circuit-breaker 12ª to the negative supply main. The automatic switch 8ª is thus closed. In closing, it opens the trip contact 32ª so that the current through its coil now passes by way of the cooling resistance 31ª to the contact block 13ª, returning by way of the contact block 15ª as before.

In starting the motor from the push-button box 1ª, on closing the starting button 2ª, current flows from the circuit-breaker 7ª through the coil of the double switch 30ª to the button 2ª and returns by way of the locking switch 4ª to the circuit-breaker 12ª and the negative supply main. The switch 30ª is thus closed and current can flow around the coil of the automatic switch 8ª and by way of the trip contact 32ª to the left-hand outer contact of the switch 30ª, returning from the middle contacts of the switch to the locking switch 4ª and thence to the negative supply main by way of the the circuit-breaker 12ª. On the consequent closing of the automatic switch 8ª the coil-exciting current passes through the cooling resistance 31ª to the right-hand contact of the switch 30ª, the return to the negative supply being made by the same leads as before.

The closing of the automatic switch serves also to close the circuit through the coil of the automatic starter 9ª the plunger of which in rising gradually cuts out armature resistance and also cuts a cooling resistance into its own coil circuit.

On the further rotation of the controller drum the contacts 26ª and 27ª serve successively to close the circuits through the fixed contact blocks 17ª—18ª and 19ª—20ª for the low-speed and high-speed clutches 33ª, and 34ª in a similar manner to that before described and the contact 28ª cuts out the remaining armature resistance 36ª by bridging the fixed contact blocks 21ª, 22ª and thus permitting current to flow around the coil of the automatic switch 10ª, the return being made from the contact block 15ª, and the locking switch 4ª. The switch 10ª, in closing, cuts into its coil circuit a cooling resistance. The field resistance is then introduced by the contact 29ª as its passes over the fixed contact blocks 23ª.

The locking switch 4ª is provided as hereinbefore described to prevent the operation of the whole of the mechanism, and this it will be understood is effected by the arrangement of the switch 4ª in the common return lead of the controlling circuits.

Two emergency buttons, 5ª and 35ª, are provided, the first being normally closed and serving to control the circuit of the coil for the no-volt circuit-breaker 12ª and indicator lamps, while the second serves, on being closed, to short-circuit the coil of the circuit-breaker 12ª.

Referring to Figs. 10 and 10ª of the drawings, which represents a diagram of the electrical connections and fittings for an equipment provided with a hand or motor-operated controller, the current from the positive supply main passes by way of a circuit-breaker 1ᵇ to a terminal 2ᵇ and thence to the fixed contact block 4ᵇ of the controller from which it passes, in the first position of the controller drum, through the controller contacts 18ᵇ, 19ᵇ, and fixed contact block 6ᵇ, to the terminal 27ᵇ whence it passes by way of the trip contact 56ᵇ to the coil 28ᵇ of the magnetic switch 29ᵇ, and returns through the circuit-breaker 33ᵇ to the negative supply. On the closing of the switch 29ᵇ the trip contact 56ᵇ is broken and current is then received by the coil 28ᵇ by way of the fixed contact blocks 4ᵇ, 3ᵇ, bridged by the contacts 16ᵇ and 17ᵇ and the terminal 57ᵇ through a cooling resistance.

The main current is completed by the switch 29ᵇ to the arm 30ᵇ of the automatic starter, the coil of which is thereupon energized.

For the armature circuit the current passes from the arm 30ᵇ of the automatic starter through the segments to the armature resistance and to the armature by way of the terminal 34ᵇ, returning to the negative supply main by way of the circuit-breaker 33ᵇ.

For the motor field circuit the current passes from the arm 30ᵇ of the automatic starter to the fixed contact block 31ᵇ, through the contact 26ᵇ short-circuiting the resistance contact blocks 15ᵇ, and to the motor field terminal 32ᵇ, returning to the circuit-breaker 33ᵇ and to the negative supply main.

On the rotation of the controller drum the low-speed clutch circuit is completed from the supply 35ᵇ, which may be from any suitable source, through the fixed contact blocks 7ᵇ and 8ᵇ by the connected contact 20ᵇ—21ᵇ of the controller drum.

Similarly, on further rotation of the controller drum, the high-speed clutch circuit is completed from a supply 36ᵇ through the fixed contact block 9ᵇ, drum contact 22ᵇ, connected drum contacts 23ᵇ, and the resistance contact blocks 10ᵇ and 11ᵇ, the low speed clutch circuit being meanwhile cut out.

As the controller drum is again rotated the armature resistance cut-outs 37ᵇ are successively operated by the closing of circuits through the fixed contact blocks 12ᵇ, 13ᵇ and the connected contacts 24ᵇ, for the speeding up of the motor, and the regulation is effected by the cutting in or out of the field resistances by means of the fixed contact blocks 14ᵇ, 31ᵇ and 15ᵇ, and the contacts 25ᵇ and 26ᵇ.

The controller is adapted for hand operation by the use of a hand wheel and clutch of any suitable type.

The motor control is effected in the following manner. The motor 38 (Fig. 10ᵃ) receives current from a suitable source and the current, after passing through the armature, is led to contact blocks 39ᵇ and 40ᵇ of the automatic reversing switch gear, the return being made from the switch arms 41ᵇ, 53ᵇ. The reversal of the controller motor is controlled from push buttons 43ᵇ, 44ᵇ, which are on one side connected to the positive side of the motor armature.

On closing the circuit through the button 43ᵇ, the current passes through the contacts 45ᵇ to the operating and retaining coil 46ᵇ and thence to the negative lead by way of the arm 41ᵇ. The left hand automatic switch is thus closed and completes the motor field circuit through the contact 39ᵇ, arm 47ᵇ, terminal 48ᵇ and through the field to the terminal 49ᵇ and thence to the contact 50ᵇ, to return through the arm 41ᵇ to the negative lead.

On closing the circuit through the button 44ᵇ the current passes through the contact 51ᵇ to the operating and retaining coil 52ᵇ and thence to the negative lead by way of the arm 53ᵇ. The right-hand automatic switch is thus closed and completes the motor field circuit through the contact 40ᵇ, arm 55ᵇ and terminal 49ᵇ, through the field and by the terminal 48ᵇ, contact 54ᵇ, and arm 53ᵇ to the negative lead, so that thus the motor field is reversed.

It will be understood that any suitable reducing gear may be provided for effecting a relatively slow movement of the driven shaft, or of the worm spindle, in the case of the construction first described.

The construction and arrangement of the various parts of the gearing and clutches may also be varied as found desirable.

The circuits for the clutches may be connected to the main source of supply or to a separate source of supply if preferable.

Any suitable form of magnetic clutch other than that hereinbefore described may be used, the particular clutch described being given merely as that which is preferred.

In certain applications of the invention it may be desirable to provide the main clutch of such construction that a braking effect is secured when the clutch is thrown out of operation.

In the case where means are provided for the operation of the controller by a motor any suitable means may be employed to transmit the drive.

It will be understood that by the term "clutch" is intended any mechanism capable of coupling together two relatively moving or rotating bodies at the will of the operator.

What I claim as my invention and desire to secure by Letters Patent is:—

1. A prime mover, a driving shaft rotated thereby, a driven shaft, a reducing gear to effect transmission between the driving and driven shafts, and adapted to transmit motion in one way only with the driving shaft, an electrically operated clutch to engage the gear to the driving shaft, an electrically operated clutch to engage the driving shaft directly to the driven shaft, a controller serving for the regulation of the operation of the prime mover and the clutches, and electric devices for starting and stopping the prime mover from one or more points, substantially as described.

2. An electric motor, a driving shaft rotated thereby, a driven shaft in alinement with the driving shaft, a reducing one way gear to effect transmission between the shafts, operatively engaged to the driving shaft by an electrically operated clutch, a similar clutch to engage the driving shaft directly with the driven shaft, a drum controller serving for the regulation of the operation of the electric motor and the clutches, and electric switch devices for starting and stopping the electric motor from one or more points, substantially as described.

3. An electric motor, a driving shaft rotated thereby, a driven shaft in alinement with the driving shaft, reducing gear to effect transmission between the shafts, adapted for engagement with the driven shaft by a low speed electrically operated clutch, an electrically operated clutch to engage the driving shaft directly with the driven shaft, there being a one way driving connection for the low speed mechanism only, a drum controller for regulating the operation of the electric motor and the clutches, and electric switch devices for starting and stopping the electric motor from one or more points, substantially as described.

4. An electric motor, a driving shaft rotated by the motor, a driven shaft in alinement with the driving shaft, one-way driving reducing gear to effect transmission between the shafts, adapted to be engaged with the driving shaft by means of a clutch, electro-magnetic means for the operation of the said clutch, an electrically operated clutch to engage the driving shaft directly with the driven shaft, a drum controller for the regulation of the operation of the electric motor and the clutches, and electric switch devices for starting and stopping the electric motor from one or more points, substantially as described.

5. An electric motor, a driving shaft rotated by the motor, a driven shaft in alinement with the driving shaft, reducing gear having a member thereof, free to move in one direction to effect transmission between the shafts, a clutch for engaging the reducing gear with the said shafts, electro-magnetic means for the operation of the said clutch, a clutch to engage the driving shaft directly with the driven shaft and a rotary cam device for operating said last mentioned clutch, means for rotating said cam device deriving movement from the motor, a drum controller for the regulation of the operation of the motor and the clutches, and electric switch devices for starting and stopping the motor from one or more points, substantially as described.

6. An electric motor, a driving shaft rotated thereby, a driven shaft in alinement with the driving shaft, reducing gear having a free wheel to effect transmission between the shafts, a clutch for engaging the reducing gear with the said shafts, electro-magnetic means for the operation of the said clutch, a clutch to engage the driving shaft directly with the driven shaft and a rotary cam device for operating said last mentioned clutch, an operating shaft provided to rotate in either direction for the rotation of the cam device, a countershaft, a loosely mounted driving wheel-armature thereon, operated from the motor, electro-magnetic clutches on the countershaft disposed one at each side of the wheel-armature and geared to the operating shaft to rotate it respectively in opposite directions, a drum controller for the regulation of the operation of the motor and the clutches, and electric switch devices for starting and stopping the motor from one or more points, substantially as described.

7. An electric motor, a driving shaft rotated thereby, a driven shaft in alinement with the driving shaft, reducing gear to effect transmission between the shafts, said gear being arrangeable to drive in one direction only, adapted to be engaged with the driving shaft, an electro-magnetically controlled clutch for effecting the engagement, a clutch to engage the driving shaft directly with the driven shaft, a rotatable disk with cam groove therein for the operation of the said clutch, an operating shaft for the rotation of the disk in either direction, electromagnetic clutches for this purpose, a gear wheel concentric with the disk and fixedly mounted in relation thereto, a transmission connection between the gear wheel and the shaft of a drum controller for the regulation of the operation of the motor and the clutches, and electric switch devices for starting and stopping the motor from one or more points, substantially as described.

8. An electric motor, a driving shaft rotated thereby, a driven shaft, reducing gear to effect transmission between the shafts, adapted to be engaged with the driving shaft, an electrically operated clutch for this purpose, another electrically operated clutch to engage the driving shaft directly with the driven shaft, one of said driving shaft engagements being arranged to permit free movement in one direction, a drum controller for the regulation of the operation of the motor and of the clutches, and electric switch devices for starting and stopping the motor from one or more points, substantially as described.

9. An electric motor, a driving shaft rotated thereby, a driven shaft in alinement with the driving shaft, a reducing gear to effect transmission between the said shafts without constant operative connection with the driving shaft and with free wheel driving connection with the driven shaft, electrically operated clutches for engaging the driving shaft with the reducing gear or directly to the driven shaft, a drum controller for the regulation of the operation of the motor and the clutches, and electric switch devices for starting and stopping the motor from one or more points, substantially as described.

10. An electric motor, a driving shaft rotated thereby, a driven shaft in alinement with the driving shaft, a reducing gear to effect transmission between the said shafts without constant operative connection with the driving shaft, whereby free movement in one direction may be permitted, electrically operated clutches for engaging the driving shaft with the reducing gear or directly to the driven shaft, a drum controller, the said drum controller serving for the regulation of the operation of the driving motor and the clutches, and electric switch devices for the purpose of starting and stopping from one or more points, substantially as described.

11. An electric motor, a driven shaft rotated thereby, a driven shaft in alinement with the driving shaft, a reducing gear to effect transmission between the said shafts without constant operative connection with the driving shaft, whereby free movement in one direction may be permitted, electrically operated clutches for engaging the driving shaft with the reducing gear or directly to the driven shaft, a drum controller serving for the regulation of the operation of the electric motor and of the clutches, and electric switch devices for starting and stopping the motor and controlling the clutch circuits from one or more points, substantially as described.

In testimony whereof I have hereunto signed my name to this specification in the presence of two subscribing witnesses.

GEORGE WILLIAM MASCORD.

Witnesses:
ROBERT OWEN HUGHES,
LIONEL ERNEST BUSSEY.

Copies of this patent may be obtained for five cents each, by addressing the "Commissioner of Patents, Washington, D. C."